Aug. 26, 1958     O. J. BORROWDALE     2,849,102
DEVICE FOR MOVING MATERIAL SUBSTANTIALLY VERTICALLY
Filed Sept. 11, 1953     5 Sheets-Sheet 2
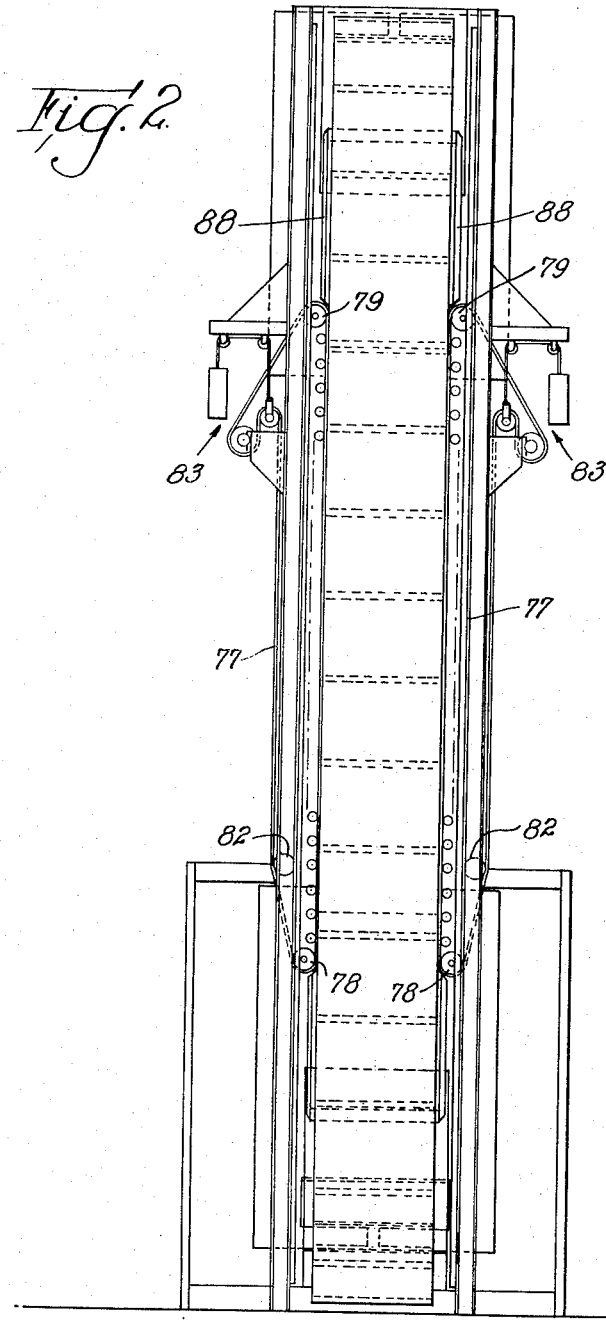
INVENTOR.
Orville J. Borrowdale
BY
Gary, Desmond and Parker
Attys.

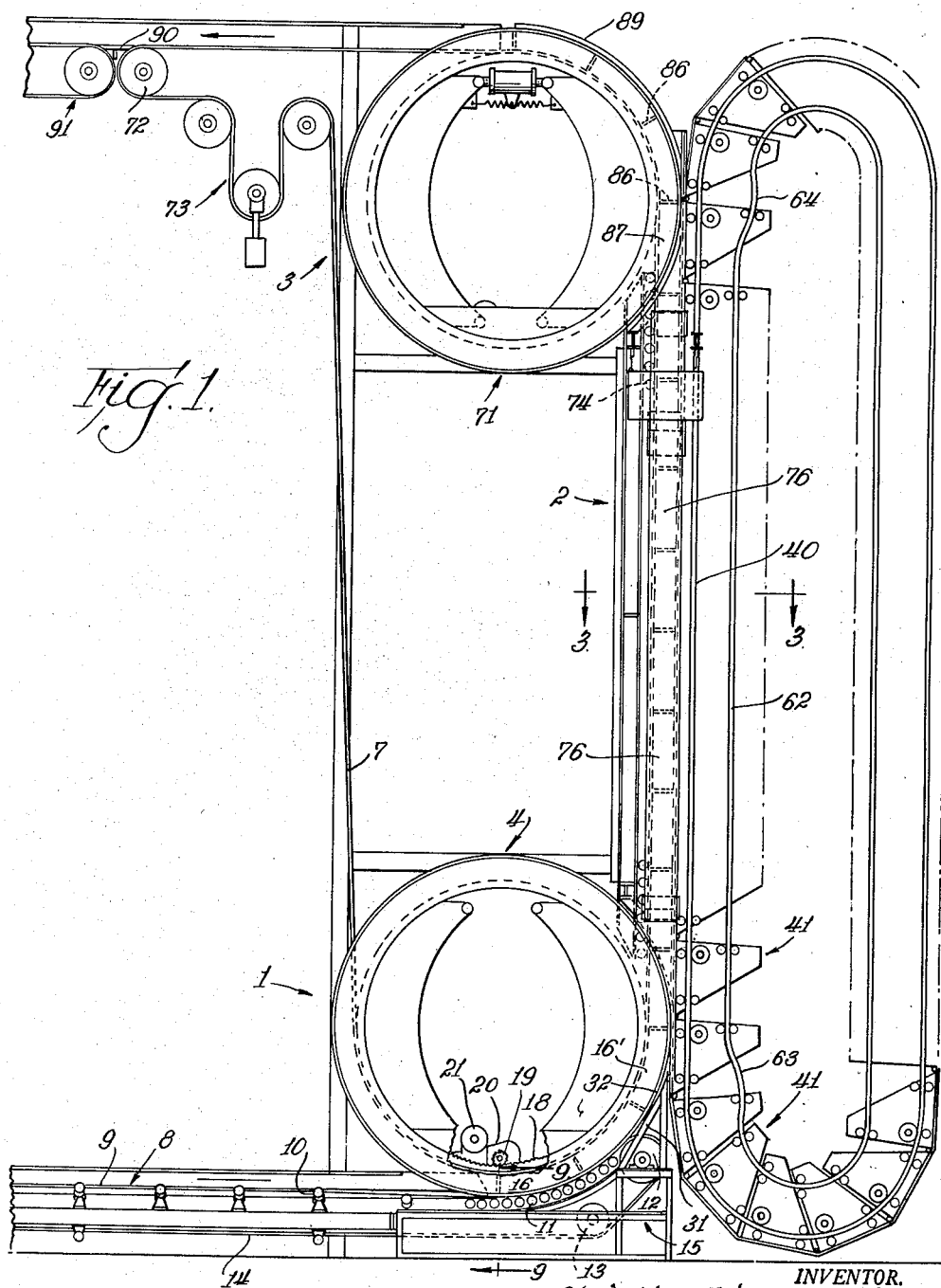

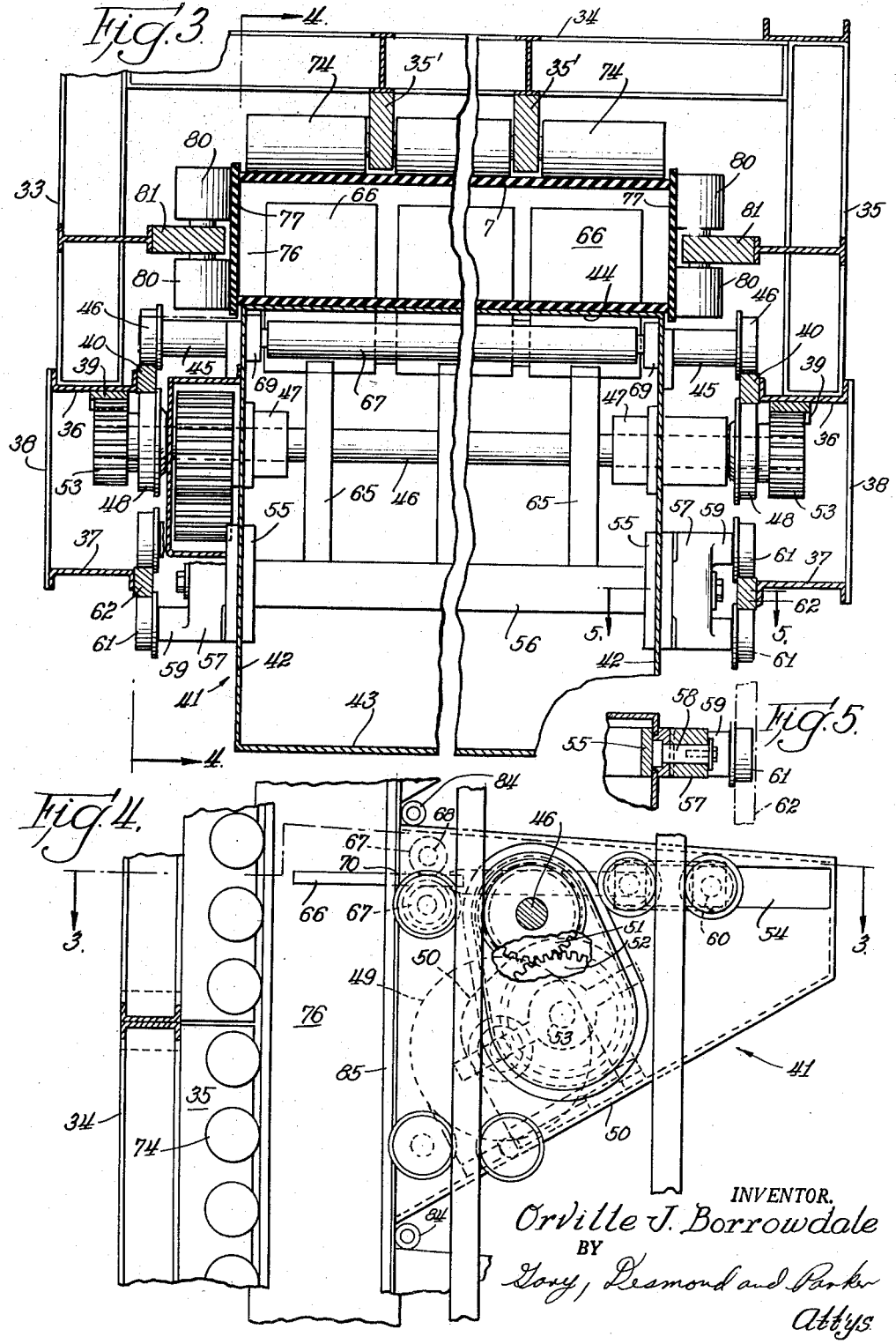

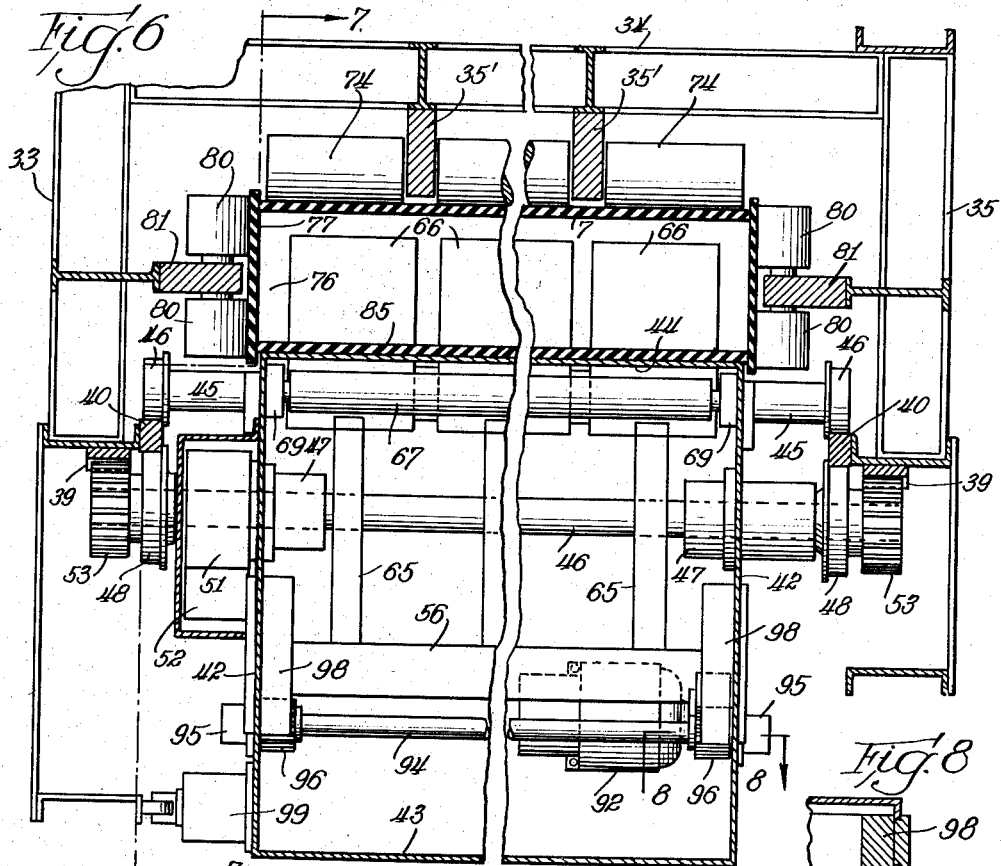

United States Patent Office 2,849,102
Patented Aug. 26, 1958

2,849,102

DEVICE FOR MOVING MATERIAL SUBSTANTIALLY VERTICALLY

Orville J. Borrowdale, Chicago, Ill.

Application September 11, 1953, Serial No. 379,671

3 Claims. (Cl. 198—82)

This invention relates to improvements in material handling equipment and refers particularly to a device for moving material in a substantially continuous fashion from one level to another level and is specifically adaptable for elevating material from a substantially horizontally moving conveyor at one level to a substantially horizontally moving conveyor at a higher level.

One of the important features of the present invention resides in the provision of a device movable in an endless path for moving material from one level to another level along a substantially vertical path.

Another important feature of the invention resides in the provision of a substantially horizontally traveling feed conveyor upon which material carried thereby has its direction of movement changed from substantially horizontal to substantially vertical, whereat a vertical elevating component receives the material and carries it substantially vertically to any desired level.

A further important feature of the invention resides in means for transferring the vertically elevated material from the aforementioned vertical elevating component to a substantially horizontally moving conveyor at a higher level.

Other objects and advantages of the present invention will be apparent from the accompanying drawings and following detailed description.

In the drawings, Fig. 1 is a side elevational view, partially diagrammatic, of my improved material handling device.

Fig. 2 is a view of the device shown in Fig. 1 looking at right-angles to Fig. 1.

Fig. 3 is an enlarged detailed sectional view taken on line 3—3 of Fig. 1 and also taken on line 3—3 of Fig. 4.

Fig. 4 is a detailed sectional view taken on line 4—4 of Fig. 3.

Fig. 5 is a fragmentary detailed sectional view taken on line 5—5 of Fig. 3.

Fig. 6 is a sectional view similar to Fig. 3 of a modification of the invention, said view being taken on line 6—6 of Fig. 7.

Fig. 7 is a sectional view taken on line 7—7 of Fig. 6.

Fig. 8 is a detailed sectional view taken on line 8—8 of Fig. 6.

Figure 9:
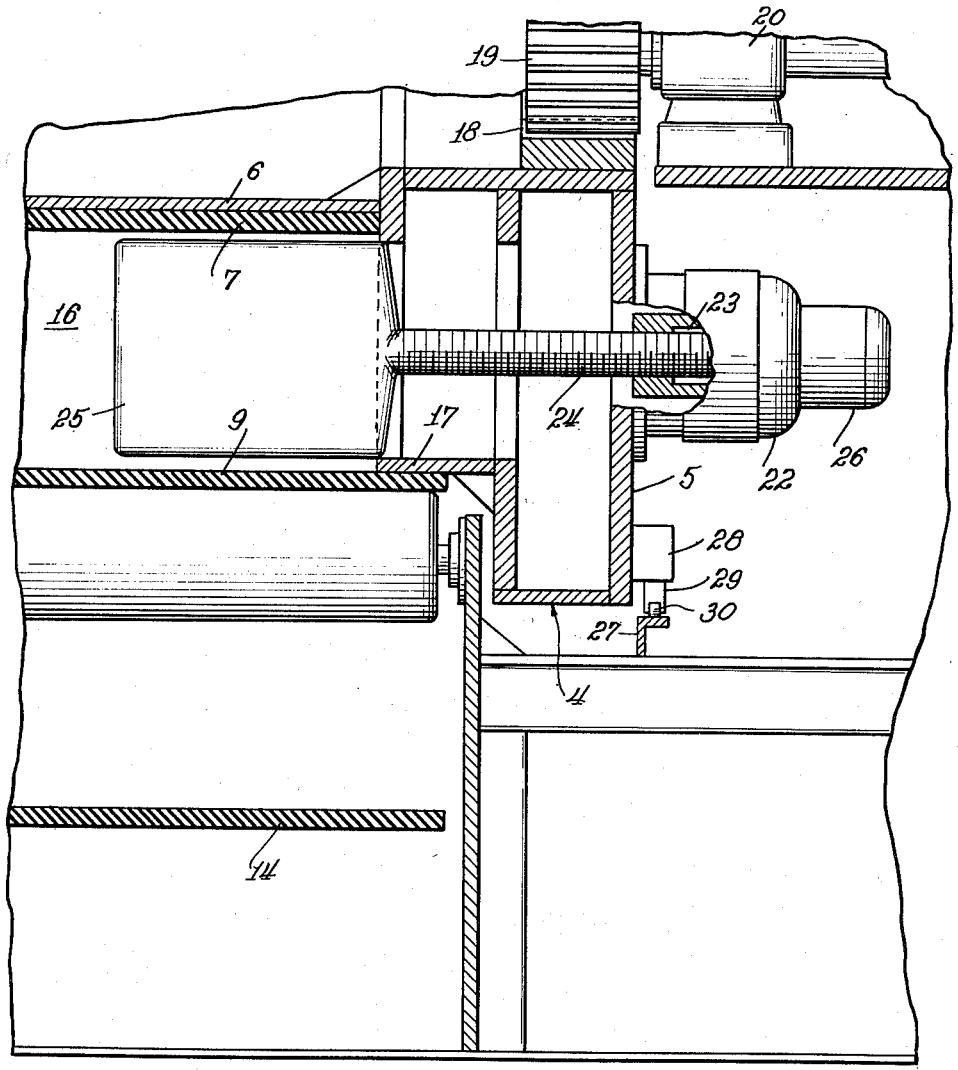
Fig. 9 is an enlarged detailed sectional view taken on line 9—9 of Fig. 1.

Referring in detail to the drawings, the device comprising the present invention includes three major units, a lower transferring unit 1, a vertical unit 2 and an upper transferring unit 3. The lower transferring unit 1 comprises a rotating frame 4 including a pair of opposite annular box-sectioned structures 5 and a cylindrical drum plate 6 (Fig. 9) which extends between the opposite box-sectioned structures. An endless, flexible conveyor belt 7 is trained around the rotating frame 4 being supported by the drum plate 6. Conveyor belt 7 may be constructed of rubber, steel or may comprise the usual reticulated or link-belt type.

A feed conveyor 8 is associated with the lower transferring unit 1 and comprises an endless, flexible conveyor belt 9 having an upper or load-carrying pass supported by spaced rollers 10. The belt 9 adjacent the rotating frame 4 is supported by a plurality of relatively closely spaced rollers 11 having their axes disposed in spaced arcuate relationship with respect to the frame 4. The belt 9 passes over a terminal roll 12 and thence around guide roll 13 to commence its return pass 14. The terminal roll 12 and guide roll 13 may be carried by a suitable frame structure 15.

For a portion of the travel of belt 7 around frame 4, belt 9 is radially spaced therefrom to define opposite walls of an arcuate space 16. To prevent belt 9 from moving into the space 16 when the belt is not loaded sufficiently to hold it in contact with rollers 11, said belt rides upon an inwardly extending pair of shoulders 17 comprising a portion of the annular box-sectioned frame 5.

The rotating frame 4 carries a ring gear 18 which is in mesh with drive pinion 19 comprising the output of a conventional speed reducer 20, the input shaft of which is driven by motor 21. Rotation of the frame 4 drives belt 7 which, if desired, may also drive a similar rotating frame comprising the upper transferring unit 3, as will be hereinafter more fully described, or, if desired, the upper rotating frame may be separately driven in timed relationship to the rotation of frame 1 by mechanism similar to that hereinbefore described for driving frame 4.

Material to be handled may be carried to the transferring unit 1 on the upper pass of belt 9, said material eventually moving into space 16. Upon arrival of the material into space 16 said material is carried arcuately upwardly upon the belt 9. In view of the fact that the material, when it begins to move upwardly may tend to slide rearwardly upon the belt, an arrangement is contemplated which partakes of the invention described in my copending application for patent Serial No. 353,934, filed May 11, 1953, now Patent No. 2,792,925. The arrangement employed herein is described as follows:

Circumferentially spaced upon each opposite annular box frame 5 are a plurality of electrical motors 22. Each motor is provided with a hollow shaft 23 through which a threaded bar or shank 24 extends, said shank carrying at its outer end a blade 25 which projects into the space 16. The motor shaft 24 drives a nut (not shown) positioned in the housing 26 secured to the motor housing, said nut being in threaded engagement with the threaded shank 24 of blade 25. Hence, by energizing motor 22 in an appropriate direction, blade 25 may be projected into or withdrawn from space 16. It is preferred that the motors and blades on frame 5 on one side are aligned with the motors and blades on the opposite frame, but, if desired the opposite motors and blades may be staggered with respect to each other.

It is desired that when the belt 9 reaches its lower substantially tangent position with respect to the rotating frame 4, that the blades, previously withdrawn from space 16, be projected into said space. Hence, the blades 25 are projected into the body of the material carried upon belt 9 and during its upward arcuate travel said blades prevent or inhibit rearward or retrogressive movement of the material. Depending upon the nature of the material being handled, the blades may take any desired shape, such as the flat blades illustrated for relatively fine discrete material such as sand, gravel, certain types of ore, or the blades may be in the form of bars or the like, if the material handled is lumpy or comprises relatively large irregular components.

To project the blades or projections 25 into the space 16 at the desired position of travel, a cam bar 27 may be positioned adjacent the lower tangent position of belt 9 and rotating frame 4. A limit switch 28 having a swingable arm 29 carrying roller 30 contacts the cam bar 27 and, hence, motor 22 is so rotated as to project the blades 25 into space 16.

A substantially triangular frame 31 is carried upon the frame 15 which supports the terminal roll 12, the triangular frame 31 carrying an arcuate transfer plate 32 which extends axially across space 16 and is radially spaced from belt 7 upon drum plate 6. Thus a continuation of space 16 is provided, designated 16' in Fig. 1, into which the material moved through space 16 is transferred by the movement of blades 25 with the rotating frame. In this fashion, the material previously moved in a substantially horizontal direction is now moved in a substantially vertical direction. At this period of travel of the material, the lower transferring device 1 has substantially completed its function. Thereafter, the material is carried vertically or substantially vertically for any desired distance by the mechanism 2, more fully described hereinafter.

The mechanism 2 is carried upon suitable frame members 33, 34 and 35 comprising a vertically built-up beam structure. Carried upon the side beams 33 and 35 are channels 36 and 37 connected by web members 38. At the upper and lower ends of the device 1 the channels 36 and 37 are so disposed as to form U-bends. Each channel 36 on each side of the device 1 carries a rack 39 which traverses the channels throughout their length and thus forms an endless oval rack with its major axis disposed vertically. A guide track 40 is also mounted on each channel 36, said guide track is also endless and follows the oval loci of the oval racks 39.

In general, the device 2 comprises a plurality of blade-carrying units 41 which move in endless fashion around the oval defined by the tracks 40, the blades carried by the units functioning to elevate the material from space 16, as will be hereinafter more fully described.

Each of the units 41 are of substantially trapezoidal shape in elevation having opposite spaced trapezoidal walls 42. Each of the units also comprises a rear wall 43 and a front wall 44. A shaft 45 is mounted upon each of the walls 42 adjacent the front wall 44 and a roller 46 is rotatably positioned upon each shaft 45. A shaft 46 extends transversely across the unit, said shaft being journaled adjacent opposite ends in bearings 47 carried by the opposite side walls 42. At one end, exteriorly of a side wall 42, shaft 46 carries a guide roller 48 and a similar guide roller 48 is carried adjacent the opposite end of shaft 46. The guide rollers 46 and 48 function to guide the unit 41 along the opposite guide rails 40 during operation of the device.

An electric motor 49 is positioned upon a wall 50 of each unit 41 and said motor, through a conventional gear reducing mechanism 50 drives a gear 51 mounted upon shaft 46, the gear 51 being in mesh with gear 52 carried upon the output shaft 53 of the gear reducer 50. Thus, shaft 46 is rotated by means of motor 49. A gear 53 is mounted upon each end of the shaft 46 and each gear 53 meshes with a rack 39 at opposite sides of the device. Thus, rotation of shaft 46 by motor 49 functions to rotate gears 53 which in turn function to translate the unit along the length of the guide rails or tracks 40. A slot 54 is provided in each of the side walls 42 of each unit 41. A block 55 is slidably positioned in each slot 54 and a transverse actuating member 56 is mounted at its opposite ends upon the oppositely spaced blocks 55. A forked bearing 57 is rotatably secured to each block 55 exteriorly of each wall 42, said bearing being mounted upon a pin 58 which is carried by block 55. Each forked bearing comprises a bearing arm 59 in which a shaft 60 is positioned and a roller 61 is carried upon each shaft 60.

A cam rail 62 is mounted upon each channel 37 at opposite sides of the device 2, said cam rails following generally the contour of the guide rails 40. However, adjacent the lower and upper portions of the device 1 the cam rails are curved, as shown best at 63 and 64 in Fig. 1. Hence, the cam rails 62 depart from the oval contour of the guide rails 40 by virtue of the curves 63 and 64. The curves 63 and 64 are such that on one side of the oval around which the units 41 travel, the cam rails 62 are disposed closer to the guide rails 40 than at the opposite side.

The rollers 61, which are hereinafter referred to as cam rollers, ride upon the cam rails 62 and during one cycle of travel the actuating bar 56 is moved laterally relative to the guide rails 40.

A plurality of blade supports 65 are mounted at one end upon the actuating bar 56 and at the opposite end of each blade support 65 a blade 66 is mounted. A pair of juxtaposed rollers 67 are mounted upon a pair of parallel shafts 68 which, in turn, are journaled in bearings 69 carried by the side walls 42. The blades 66 carried by the support 65 are positioned between the rollers 67 and are guided by said rollers for reciprocating motion therebetween in conformity with the movement of the actuating bar 56. The front wall 44 of each unit is provided with a slot 70 through which the blades 66 extend outwardly from said front wall. The arrangement is such that when the units 41 move along the guide rails 40, the cam rails 62 function, through the agency of the cam rollers 61 to reciprocate the actuating bar 56 and reciprocation of said actuating bar moves the blades 66 in a reciprocating fashion relative to the front wall 44.

As has been hereinbefore described, belt 7 wraps around the rotatable frame 4 comprising the lower transferring unit 1. The upper transferring unit 3 also comprises a rotatable frame 71 which is substantially identical with the rotatable frame 4. Belt 7 after passing around the lower rotatable frame travels substantially vertically upwardly and wraps around a portion of the rotatable frame 71, thence passes around terminal roll 72, tightener rolls 73 and returns to rotatable frame 4.

In passing from frame 4 to frame 71 the belt is guided and laterally supported in spaced relationship to the front walls 44 of the units 41 by a plurality of rollers 74 which are supported by brackets 75 mounted upon the vertical beam 34. Thus, the front walls 44 of the units 41, when said units move upwardly, and belt 7 when it moves upwardly, define opposite faces of a space 76. This is the space into which the blades 66 are projected and withdrawn by the contour of the cam rails 62, the inward and outward movement of the blades occurring at the bends 63 and 64, respectively.

The space 76 is also defined by opposite belts 77 which are disposed in spaced relationship to each other and at right-angles to belt 7 and the front faces 44 of units 41 during a major portion of their upward travel. Belts 77 are trained around two pairs of opposite terminal rolls 78 and 79 and each belt is guided and laterally supported during its upward travel by rollers 80 carried upon brackets 71 which are, in turn, mounted upon the opposite vertical beams 33 and 35. The belts 77 at their return or downward passes are guided by guide rolls 82 and are trained around conventional belt-tightener mechanisms 83.

Thus, the space 16' between the arcuate transfer plate 32 and belt 7 connects with the space 76 defined by belts 7 and 77 and the front faces 55 of units 41. As will be hereinafter more fully described, it is through space 77 that the material handled is carried throughout a major portion of its vertical travel.

To make the front faces 44 of the units 41 more or less continuous, the edges of the front faces of adjacent units are hinged together by hinges 84 whereby all of the units move along rails 40 together. In addition, a substantially endless belt-like member 85 may be secured to all of the front faces 44 of the units 41, said belt-like member being appropriately apertured to permit the protrusion of the blades 66. The belt-like member may be constructed of a material similar to the belts 7 and 77 and may be fixedly joined to the front faces of the units.

It will be noted that at approximately the upper end of the arcuate transfer plate 32, the cam rail bend 63 occurs. The arrangement is such that immediately after the blades 66 clear the upper edges of the transfer plate, the curved cam rail causes said blades to move inwardly into space 16'. Hence, blades 25 carried by the rotatable frame 4 carry the material being handled into and through space 16 whereat blades 66 moves into said space and into the material in said space and carry the material upwardly therefrom in space 76.

Shortly after the blades 25 clear the upper edge of the arcuate transfer plate 32 motors 22 carried by the rotatable frame 4 are actuated to retract the blades. The actuation of motors 22 is accomplished by a suitable cam rail (not shown) which actuates a limit switch (not shown) similar to limit switch 28.

Of course, the material carried upwardly in the substantially vertical space 76 is dependent for its movement largely on blades 66. However, the defining walls of the space 76 comprise upwardly moving belts 7, 77 and the belt-like member 85 and hence, the upward movement of the material is assisted substantially by these moving defining walls.

As has been hereinbefore described, the rotating frame 71 is substantially identical with the rotating frame 4, having movable blades 86 similar to blades 25, the blades 86 being actuated by motors (not shown) in a manner similar to that described in conjunction with blades 25. The blades 86 after passing above the terminal pulleys 79 of belts 77 project outwardly into a space 87 defined essentially by belt 7, belt-like member 85 and opposite side transfer plates 88. Shortly after blades 86 project into said space, the units 41, as they approach the bends 64 in the cam rails 62, have their blades 66 retracted, and thereafter said blades remain retracted until the bends 63 are encountered in the cam rails. Thereafter the material carried in space 87 is supported by the blades 86 and the belt 7, an arcuate plate 89 being positioned adjacent the path of travel of the outer edges of the blades 86 and functioning as an outer defining wall of space 87.

Prior to reaching the uppermost position of travel of the blades 86 upon rotatable frame 71, the blades 86 are retracted and the elevated material is then carried upon the upper surface of belt 7. The belt 7 then passes over terminal roll 72 and commences its return pass to the rotatable frame 4. The material may then pass over transfer plate 90 to the upper pass of a conveyor 91 by which it may be carried to a desired location.

In the apparatus hereinbefore described, the blades or projections 66 were moved into and out of space 76 by means of cam rails 62 acting upon the cam rollers 61. As a modification of the invention each of the blades or projections may be separately operated in a manner and by means hereinafter more fully described.

Referring particularly to Figs. 6 and 7, the apparatus shown therein is substantially identical with that shown in Figs. 3 and 4 except for the mechanism for projecting and retracting the blades 66. Without further description of the identical parts, like reference numerals will be applied to like parts and only the specific modified portions of the mechanism will be described in detail.

A motor 92 is mounted upon the bottom wall 50 of each of the units 41 and each motor carries a pinion 93 upon its shaft. A shaft 94 is journaled in bearings 95 carried by the opposite side walls 42. Adjacent each end of each shaft 94 within the walls 42, a pinion 96 is mounted upon said shaft, said pinions engaging with the teeth of racks 97 carried upon the lower portions of slidable blocks 98 which are slidably positioned in the opposite slots 54. The actuating bar 56 is mounted at each of its ends upon the blocks 98 and, hence, when motor 93 is operated the actuating bar 56 is moved transversely to project or retract the blades or projections 66 relative to space 76.

To actuate the motors 92 when the units 41 reach the positions corresponding generally to the locations of the bends 63 and 64 in Fig. 1, a pair of limit switches 99, only one of which is shown, may be carried by a side wall 42 of each unit. The limit switches 99 may be actuated by suitable cams (not shown) to energize the motors 92 at the appropriate phase of travel of the unit and to cause said motor to rotate in the desired direction to project or retract the blade 66.

In all other respects the modified form of the invention functions in the manner hereinbefore described, the blades 66 assisting in raising the material from the transferring unit 1 to the unit 3.

Although the device comprising the present invention lends itself ideally to the raising of material from one elevation to a higher elevation, the device can be operated in reverse, that is, to lower material from unit 3 to unit 1 where a controlled downward feed of material is desired. For example, the material handled may be of a more or less fragile nature in which case a controlled descent of the material by the use of the blades 86, 66 and 25 may be desired. To operate the device in reverse it is merely necessary to reverse the direction of motion of the various driving mechanisms.

Other modifications of the present invention will occur to those skilled in the art and, hence, I do not wish to be limited to the precise details shown and described except as necessitated by the appended claims.

I claim as my invention:

1. A device for moving material from one elevation to another which comprises, a frame rotatable in a substantially vertical plane, circumferentially spaced projections carried by said frame, means for conveying material into the path of movement of said projections whereby said material is carried by said projections, a plurality of units movable substantially vertically in seriatim, a projection carried by each unit, said unit projections being movable in the path of travel of the material carried by said frame projections whereby said material is carried substantially vertically by said unit projections, a second frame rotatable in a substantially vertical plane, circumferentially spaced projections carried by said second frame, said second frame projections being movable in the path of travel of the material carried by said unit projections whereby said material is carried by the second frame projections, and endless conveyor means disposed adjacent the path of travel of the material carried by said second frame projections whereby said material is transferred to said endless conveyor means.

2. A device for moving material from one elevation to another which comprises, a frame rotatable in a substantially vertical plane, spaced projections carried by said frame, means for charging material into the path of travel of said projections whereby said material is urged forward by said projections, a plurality of units movable substantially vertically in seriatim, a projection carried by each unit, means for moving said unit projections into the path of travel of the material urged by said frame projections whereby said material is urged vertically by said unit projections, a second frame rotatable in a substantially vertical plane space vertically from said first-mentioned frame, projections carried by said second frame movable in the path of travel of the material urged by said unit projections whereby said material is urged forwardly by said second frame projections, and conveyor means carried by said second frame receiving the material urged forwardly by said second frame projections.

3. A device for elevating material from one elevation to a higher elevation which comprises, a pair of vertically spaced frames rotatable in substantially vertical planes, an endless member wrapped around said frames, a plurality of projections carried in circumferentially spaced relationship to each other carried upon each of said frames, means for moving material to be elevated into the path of travel of the projections of said lower frame and adjacent said endless member whereby said material is urged forwardly and upwardly by said projections, a substantially vertically disposed frame positioned adjacent said two rotatable frames, a plurality of units movable in seriatim upwardly upon said vertical frame in parallel spaced relationship to the upward pass of said endless member, a projection carried by each unit, said unit projections being movable in the path of travel of the material urged upwardly by said lower frame projections whereby said material is urged upwardly by said unit projections between said units and said endless member, and the upper rotatable frame projections being movable in the path of travel of the material urged upwardly by said unit projections whereby said material is urged upwardly and rearwardly by said upper frame projections.

References Cited in the file of this patent

UNITED STATES PATENTS

| | | |
|---|---|---|
| 372,889 | Benedict | Nov. 8, 1887 |
| 594,583 | Wood | Nov. 30, 1897 |
| 2,415,592 | Hoenecke | Feb. 11, 1947 |
| 2,601,558 | Redler | June 24, 1952 |
| 2,709,640 | LeBaron | May 31, 1955 |

FOREIGN PATENTS

| | | |
|---|---|---|
| 627,608 | Germany | Mar. 19, 1936 |